United States Patent [19]
Kopf

[11] Patent Number: 5,342,517
[45] Date of Patent: Aug. 30, 1994

[54] FILTRATION CASSETTE ARTICLE, AND FILTER COMPRISING SAME

[76] Inventor: Henry B. Kopf, 108 Coatbridge Cir., Cary, N.C. 27511

[21] Appl. No.: 3,518

[22] Filed: Jan. 12, 1993

Related U.S. Application Data

[60] Continuation-in-part of Ser. No. 760,339, Sep. 16, 1991, Pat. No. 5,232,589, which is a division of Ser. No. 364,616, Jun. 6, 1989, Pat. No. 5,049,268, which is a continuation-in-part of Ser. No. 235,046, Aug. 22, 1988, Pat. No. 4,867,876, which is a continuation-in-part of Ser. No. 104,177, Oct. 2, 1987, Pat. No. 4,882,050.

[51] Int. Cl.$^5$ .................... B01D 25/12; B01D 61/00; B01D 71/02; B01D 71/06
[52] U.S. Cl. .................... 210/228; 210/231; 210/232; 210/321.75; 210/321.84; 210/323.1; 210/455; 210/456; 422/101; 436/178; 435/311
[58] Field of Search ............... 210/232, 228, 230, 231, 210/321.75, 321.84, 238, 484, 456, 455; 422/101; 436/178; 435/311

[56] References Cited

U.S. PATENT DOCUMENTS

| | | |
|---|---|---|
| 744,761 | 11/1903 | James . |
| 802,105 | 10/1905 | Johnson et al. . |
| 1,138,251 | 5/1915 | Schaefer . |
| 1,282,414 | 12/1918 | Hagstrom . |
| 1,540,251 | 9/1925 | Buckley et al. . |
| 2,390,628 | 12/1945 | Van Winkle ..................... 210/188 |
| 2,473,986 | 9/1949 | Booth ............................ 210/185 |
| 2,590,242 | 3/1952 | Fusco ........................... 210/188 |
| 3,221,883 | 12/1965 | Linnstrom ...................... 210/228 |
| 3,520,803 | 7/1970 | Iaconelli . |
| 3,585,131 | 6/1971 | Esmond ......................... 210/321 |
| 3,703,466 | 11/1972 | LaForest . |
| 3,966,612 | 6/1976 | Johansson ...................... 210/238 |
| 3,988,242 | 10/1976 | Kurita et al. ................... 210/227 |
| 4,229,304 | 10/1980 | Fismer .......................... 210/231 |
| 4,235,721 | 11/1980 | Nakamura et al. ............... 210/227 |
| 4,310,416 | 1/1982 | Tanaka et al. .................. 210/321.3 |
| 4,411,784 | 10/1983 | Esmond ......................... 210/321.1 |
| 4,430,218 | 2/1984 | Perl et al. ..................... 210/321.3 |
| 4,540,492 | 9/1985 | Kessler . |
| 4,543,187 | 9/1985 | Stepacher ....................... 210/232 |
| 4,624,784 | 11/1986 | Lefebvre ........................ 210/321.1 |

(List continued on next page.)

FOREIGN PATENT DOCUMENTS

| | | |
|---|---|---|
| 36926 | 8/1984 | European Pat. Off. . |
| 2930986 | 2/1980 | Fed. Rep. of Germany . |
| 229603 | 1/1985 | German Democratic Rep. . |
| 8600237 | 1/1986 | PCT Int'l Appl. . |
| 1392030 | 4/1975 | United Kingdom . |

OTHER PUBLICATIONS

Prostak TM Bench Top Development System Lit. No. SD200 Aug. 1988.
"Toyo Soda Ultrafiltration Cassette UF-LABO" undated.
"Laboratory Ultrafiltration Products for Improved Biologicals Recover" Lit. No. AB841, Oct. 1988.
"Shoten the Race to the Market with Millipore Pilot and Process Systems." Lit. No. SD100 Jan. 1988.
Minisette ® Systems, Tangential Ultrafiltration and Microfiltration Membrane Cassette Systems for Processing vol. of 1–20 Liter Batches. Product Brochure of Filtron Technology Corporation, 50 Bearfoot Road, Northborough, Mass. 01532, Copr. 1989, Literature No. FPL004.
Microporous Filters, OHV Configuration Installation Instructions, Copr. 1978, Milliport Corporation, Bedford, Mass., Product Literature Part No. 6847.

(List continued on next page.)

*Primary Examiner*—Thomas M. Lithgow
*Attorney, Agent, or Firm*—Steven J. Hultquist

[57] ABSTRACT

A filtration cassette, of a type comprising membrane filter sheets arranged in a peripherally bonded array of multilaminate character wherein the filter sheets alternate with foraminous (e.g., screen or mesh) sheet elements, and a cross-flow filter comprising a multiplicity of stacked filtration cassettes of such type. The filtration cassettes and filter of the invention may be advantageously employed for dewatering of aqueous biomass suspensions, desalting of proteins, removal of secreted metabolites from cellular suspensions, and the like.

13 Claims, 4 Drawing Sheets

U.S. PATENT DOCUMENTS

| | | | |
|---|---|---|---|
| 4,735,718 | 5/1986 | Peters | 210/321.1 |
| 4,750,983 | 6/1988 | Foster et al. | |
| 4,769,140 | 9/1988 | Van Dijk et al. | 210/184 |
| 4,801,381 | 1/1989 | Niesen | 210/321.84 |
| 4,867,876 | 9/1989 | Kopf | 210/228 |
| 4,882,050 | 1/1989 | Kopf . | |
| 4,956,085 | 9/1990 | Kopf . | |
| 5,034,124 | 7/1991 | Kopf . | |
| 5,049,268 | 9/1991 | Kopf . | |
| 5,096,582 | 3/1992 | Lombardi . | |
| 5,217,612 | 6/1993 | Ondrick . | |
| 5,225,080 | 7/1993 | Karbachsch . | |
| 5,232,589 | 8/1993 | Kopf . | |

FILTRATION CASSETTE ARTICLE, AND FILTER COMPRISING SAME

CROSS-REFERENCE TO RELATED APPLICATIONS

This is a continuation in part of U.S. application Ser. No. 07/760,339 filed Sep. 16, 1991, and issued Aug. 3, 1993, as U.S. Pat. No. 5,232,589, which in turn is a division of U.S. application Ser. No. 07/364,616 filed Jun. 6, 1989 and issued Sep. 17, 1991 as U.S. Pat. No. 5,049,268, which in turn is a continuation-in-part of U.S. application Ser. No. 07/235,046 filed Aug. 22, 1988 and issued Nov. 21, 1991 as U.S. Pat. No. 4,867,876, which in turn is a continuation-in-part of U.S. application Ser. No. 07.104,177 filed Oct. 2, 1987 and issued Sep. 19, 1989 as U.S. Pat. No. 4,882,050.

BACKGROUND OF THE INVENTION

1. Field of the Invention

This invention relates generally to filtration cassettes, of a type comprising membrane filter sheets arranged in a peripherally bonded array of multilaminate character wherein the filter sheets alternate with foraminous (e.g., screen or mesh) sheet elements, and to cross-flow filters comprising a multiplicity of stacked filtration cassettes of such type, as well as to a method of making such filtration cassettes.

2. Description of the Related Art

Stacked plate cross-flow filters are utilized in a variety of solids-liquid separation operations, including the dewatering of solids-liquid suspensions such as aqueous biomass suspensions, the desalting of proteins, and the removal of secreted metabolite from cellular cultures.

In such systems, the stacked plates making up the cross-flow filter are typically mounted in a unitary frame structure whereby the respective plates are retained in alignment, in a so-called "plate and frame" construction.

A unitary liquid feed conduit provided with openings at spaced intervals along its length and extending through the stacked plates is typically employed as a feed means from which influent solids-containing liquid is introduced into the flow channels defined between adjacent plates in the stacked plate assembly. The flow channels in the plate and frame filter contain filter elements, such as disposable filter papers sheets, with which the solids-containing liquid is contacted and through which solids-depleted liquid passes. A unitary liquid withdrawal conduit featuring openings at spaced intervals along its length extends through the stacked plates in liquid flow communication with the respective flow channels of the stacked plate assembly and conveys solids-depleted liquid out of the filter system.

As filtration proceeds, the filtered solids build up in the flow channels of the filter, on the "feed liquid sides", i.e., active filtration surfaces, of the filter sheets. The filter then is periodically backwashed, or alternatively, it may be fully shut down after a predetermined time or after a predetermined level of solids has accumulated in the flow channels on the filtration surfaces of the filter sheet elements, following which the system is drained of liquid, and the filter sheets replaces as necessary.

In one type of presently marketed stacked filter system, commercially available from Millipore Corporation (Bedford, Mass.) as the Prostak ® cross-flow filter, the adjacent filter plates define a flow channel. Solids-containing influent liquid is fed at one side of the plate from a central location into a transversely extending feed distribution conduit, which is provided with openings at spaced-apart intervals along the length of the conduit for egress of the solids-containing liquid. At the opposite side of the adjacent plates, the flow channel is similarly constructed with a liquid collection conduit having openings along its length to collect the solids-depleted liquid and discharge same from an central outlet communicating with the collection conduit.

A major problem which has been encountered in cross-flow filters of the above-described type is that of the liquid flow distribution, as for example reflected by the volumetric liquid flow rate or liquid superficial velocity, is highly non-uniform in the transverse direction of the flow channel. Such maldistribution of the solids-containing liquid is a result of the fact that the influent liquid is introduced into the feed distribution conduit at a central location.

due to the pressure drop in the transverse direction, from the medial inlet port of the extremities of the feed distribution conduit, the local longitudinal flow (cross-flow) of liquid from the inlet side to the outlet side of the stacked plates, at progressively farther transverse distances from the central liquid inlet port, is progressively reduced to an extent which is commensurate with the pressure drop experienced as the liquid is directed transversely to the outer extremities of the distribution conduit.

As a result, there is preferential channeling of the liquid at the central part of the flow channel from the inlet side to the outlet side thereof, and concomitant under-utilization of the peripheral areas of the filter. When the solids in the central portion have been built up to a point requiring backwashing or draining of the filter, the peripheral areas of the filter sheet have available capacity to separate solids from the feed liquid.

Such transverse maldistribution of the feed liquid in cross-flow filter of the aforementioned type could conceivably be overcome by the provision of the header manifolds to introduced feed liquid into the filtration channels at multiple introduction points along the sides of the stacked filter plates, with a corresponding outlet header manifold arrangement at the opposite side of the stacked plates. Unfortunately, however, such provision would significantly increase the overall system pressure drop as well as the complexity of the filter system, since it could be necessary to positively seal the multiplicity of feed liquid branch lines passing from the manifold into the filter.

Another type of stacked plate cross-flow filter which has been commercialized employs a transversely extending liquid distribution conduit with spaced-apart openings therein to introduce solids-containing liquid into the flow channel between adjacent stacked plates, but instead of a central inlet port to flow the solids-containing liquid to such conduit, the liquid is axially fed into the conduit from a feed line connected to a transverse extremity of the conduit. Filters of such type are available from Millipore Corporation (Bedford, Mass.) under the trademark Pellicone ®. This feed arrangement results in a progressive diminution of the liquid pressure at increasing transverse distances in the feed end of the distribution conduit, which in turn results in progressively transversely decreased cross-flow rates of liquid in the flow channel.

In an effort to overcome the aforementioned liquid flow maldistribution characteristics of stacked plate filters, filter plates have been constructed with baffle elements defining discrete flow channels, with the intent of achieving a more uniform distribution of the solids-containing influent liquid across the full areal extent of the filter elements in the flow channels of the filter.

A filter plate commercially available from Toyo Soda Manufacturing Company, Ltd. (Tokyo, Japan) features a structure in which solids-containing influent liquid is introduced to the flow channel at a central inlet port atone side of the plate. A wall is disposed in front of the liquid inlet, extending upwardly from the floor of the flow channel and transversely toward the extremities of the flow channel, to divide the influent system into two outwardly directed streams. Downstream from such steam-splitting wall is a longitudinally extending divider partition, the steam-splitting wall and the divider partition together forming a "T" construction when viewed in plan view. Longitudinally spaced from a parallel to the stream-splitting wall are a series of baffle partitions on either side of the divider partition. The baffles extend transversely part-way across the flow channel on either side of the divider partition, so that there is formed a serpentine flow path for each of the split streams, on the respective sides of the partition. A unitary liquid outlet port is provided at the opposite side of the stacked plates from the inlet port, whereby the respective serpentine flows are finally joined and discharged from the flow channels of the filter.

Although the dual serpentine flow path arrangement described above provides a somewhat better distribution of liquid flow across the area extent of the filter paper element, the sharp turns in the flow path at the extremities of the baffles create edge and entrance effects in the flow streams which produce substantial dead space and bypassing therein. As a result of such anomalous flow phenomena, the filtration efficiency of the baffled serpentine flow arrangement is significantly reduced.

A microporous filter article is commercially available from Millipore Corporation (Bedford, Mass.) under the trademark MF-Millipore, as a stacked array comprising a top gasket sheet member, a filtrate separator plate, a filter sheet of microporous filtration medium, a retentate separator plate, a second filter sheet of microporous filtration medium, a filtrate separator plate, and a bottom gasket sheet member. The filtrate separator plates and the retentate separator plate include a peripheral border including manifold openings therein, circumscribingly enclosing a central screen or mesh flow channel area. In operation, a recirculating fluid path across the filter sheets is directed by the retentate screen, in the flow channel area of the retentate separator plate, which contacts the two filter sheets. The filter sheets separates the solution or other feed material to be separated, according to the porosity rating of the filter sheets, and the filtrate screen, in the flow channel area of the filtrate separator plate, carries away the filtrate to the manifold openings in the peripheral borders of the filtrate separator plates. The filtrate then flows through the manifold openings of the filtrate separator plates to a filtrate collection means such as a vessel which is provided exteriorly of the filter comprising a stacked array of such filter articles.

Tangential ultrafiltration and microfiltration membrane cassette systems are available from Filtron Technology Corporation (Northborough, Mass.) under the trademarks Minisette, Centrasette and Maxisette, which comprise multiple layers of membrane assemblies composed of ultrafiltration or microfiltration membrane disposed between polymeric screen or linear open channel retentate separators and screen filtrate separators. Blocked borders on the filtrate and retentate screens direct the filtrate to collection ports on a bottom cell manifold. Cassettes can be provided in a stacked array, or cell, mounted between end plates, which may be provided with suitable ports, for introduction of feed material to be secarated in the cassettes, and for discharge or withdrawal of filtrate and retentate.

My U.S. Pat. No. 4,867,876 describes a filter plate characterized by substantially uniform transverse distribution of liquid from a unitary liquid feed port, and highly uniform liquid cross-flow across the full transverse extent of the flow channel formed when plates of such type are stacked to form a cross-flow filter.

The filter plate of this copending application has a generally planar and rectangular shape with a substantially flat bottom surface. A top surface of the plate is provided with an upwardly extending wall circumscribingly bounding a flow channel of generally rectangular shape. A liquid inlet port is disposed at a medial part of a first side of the flow channel, with the liquid outlet port at a medial part of a second side of the flow channel opposite the first side thereof. The liquid inlet port is joined in liquid flow communication with a liquid feed trough extending transversely across the first side of the flow channel, and the liquid outlet port is joined in liquid flow communication with a liquid collection trough extending transversely across the second side of the flow channel.

In this construction, a plurality of spaced-apart partitions extend upwardly from the floor of the flow channel between the liquid feed trough and the liquid collection trough. These partitions are of lesser height than the walls circumscribing the flow channel and are substantially parallel to one another, to define a series of sub-channels extending longitudinally between the liquid feed trough and the liquid collection trough. Both the liquid feed trough and the liquid collection trough are of progressively increasing depth from their respective medial portions to their marginal extremities.

Plates of this prior copending application may be utilized in stacked pairs to form enclosed flow channels within which filtration may take place in a highly efficient manner. Specifically, a first plate of the type broadly described above is paired with a structurally identical second plate positioned in inverted relationship to the first plate, such that the respective circumscribingly bounding walls of the first and second plates are in abutting sealing contact with one another. In this stacked arrangement, a filter element support of generally rectangular shape approximating the dimensions of the flow channel is interposed between the adjacent plates, with filter sheet elements between the support and each of the respective pair filter plates.

My U.S. Pat. No. 4,882,050 discloses a filter plate suitable for use with filter elements to form a stacked plate filter. In the stacked plate filter, pairs of such filter plates are mated with filter elements therebetween, to form flow channels wherein solids-containing liquid may be contacted with the filter sheet elements for filtration thereof to produce solids-reduced liquid, and permeate.

The filter plate of this prior co-pending application has a generally planar shape with a substantially flat bottom surface. A top surface of the plate is provided with a first upwardly extending wall circumscribingly bounding a flow channel of generally rectangular shape.

The flow channel in this prior application design is circumscribingly bounded by a second upwardly extending wall interior to and of lesser height than the first circumscribingly bounding wall, the second wall being in spaced-relation to the outer wall along diagonally opposed L-shaped peripheral sections of the flow channel, each such L-shaped peripheral sections comprising a leg extending transversely across the flow channel for a major portion of the length thereof, and a leg dimension of the flow channel and communicating at its extremity with an opening extending through the plate, with the portions of the periphery of the flow channel not comprising such L-shaped sections comprising ridge elements extending between the first and second circumscribingly bounding walls.

A liquid inlet port is disposed at a first side of the flow channel in this prior design, with a liquid outlet port at a second side of the flow channel opposite the first side thereof.

The liquid inlet port in this prior plate is joined in liquid flow communication with a liquid feed trough interior to the second bounding wall and extending transversely across the first side of the flow channel. The liquid outlet port is joined in liquid flow communication with a liquid collection trough interior to the second bounding wall and extending transversely across the second side of the flow channel.

A plurality of spaced-apart partitions extend upwardly from the floor of the flow channel between the liquid feed trough and the liquid collection trough. Such partitions are substantially parallel to one another to define a series of sub-channels extending longitudinally between the liquid feed trough and the liquid collection trough. These partitions preferably are of lesser height than the first (outer) wall circumscribing the flow channel and of substantially the same height as the second (inner) wall circumscribing the flow channel.

Plates of the foregoing type may be utilized in stacked pairs to form enclosed flow channels within which filtration may take place in a highly efficient manner. Specifically, a first plate of this type broadly described above may be paired with a plate of the type broadly described above may be paired with a corresponding second plate positioned in inverted relationship to the first plate, such that the respective first circumscribingly bounding walls of the first and second plates are abutting sealing contact with one another. In such stacked arrangement, a filter element of generally rectangular shape approximating the dimensions of the flow channel is interposed between the adjacent plates, suitably with its peripheral edges reposed on the second bounding wall. Such filter element is provided with an interior flow structure, whereby permeate entering the interior of the element is conveyed to the edge portions of the element for discharge into the aforementioned L-shaped peripheral sections of the flow channel between the respective first and second bounding walls. In an illustrative aspect, the filter element may comprise a foraminous support of generally rectangular shape approximating the dimensions of the flow channel, interposed between the adjacent plates, with filter sheet elements between the foraminous support and each of the respective filter plates.

In the operation of a stacked filter plate assembly of the type disclosed in my U.S. Pat. No. 4,882,050, liquid introduced via the liquid inlet port enters the liquid feed trough and is laterally distributed from the associated portion of the feed trough to outer extremities thereof. The liquid flow is directed into the sub-channels to yield a longitudinal liquid cross-flow which is highly uniform over the full transverse extent of the flow channel, so that the full areal extent of the filter element is highly effectively utilized. As a result, the solids filtration capacity of the stacked plate assembly is substantially increased and the assembly is capable of significantly extended operation prior to regeneration of the filter, as compared to various prior art cross-flow plate and frame filters.

My U.S. Pat. No. 5,049,268 discloses a filter plate which may be used in invertedly facing pairs, with a sheetholder having filter sheets disposed on its respective faces, mounted between the facing filter plates. The filter plate is characterized by (a) a generally rectangular and generally planar shape with main top and bottom surfaces; (b) a first wall extending upwardly from said main top surface and circumscribingly bounding a flow channel area of generally rectangular shape thereon; (c) a second wall on said main top surface extending upwardly therefrom, said second wall being interior to and of lesser height than said first wall and in spaced relation to the first along diagonally opposed L-shaped peripheral sections of the flow channel area; (d) each L-shaped peripheral section comprising a leg extending transversely across the flow channel area for a major portion of the width thereof, and a leg extending longitudinally for a portion of the length of the flow channel area and communicating at its extremity with an opening extending through the plate, with peripheral portions of the flow channel area not comprising such L-shaped sections comprising ridges extending between the first and second walls; (e) an inlet port opening at a corner portion of the filter plate at a first end thereof, extending through the plate, interiorly positioned in a polygonal-shaped distribution basin on the main bottom surface of the plate, said distribution basin being bounded by generally linear side edges defining corners of the basin at respective intersections of the side edges; (f) an inlet trough opening extending through said plate and transversely across a major portion of the width of said flow channel area and along a first side edge of said distribution basin, such that said liquid inlet trough opening communicates said distribution basin on the main bottom surface of the plate with said flow channel area on the main top surface of the plate; (g) an outlet port opening at a corner portion of said plate diagonally opposite said inlet port opening, said outlet port opening extending through the plate, interiorly positioned in a polygonal-shaped collection basin on the main bottom surface of the plate, said collection basin being bounded by generally linear side edges defining corners of the collection basin at respective intersections of the side edges thereof; (h) an outlet trough opening extending through the plate and transversely across a major portion of the width of said flow channel area and long a first side edge of said collection basin, such that said outlet trough opening communicates said collection basin on the main bottom surface of the plate with said flow channel area on the main top surface of the plate; and (i) a plurality of transversely spaced-apart partitions extending upwardly from the floor of the flow channel area between the liquid feed trough and the liquid collection trough, said partitions being of substantially the same height as the second wall and substantially parallel to one another to define a series of channels between the partitions, extending longitudinally between the liquid feed trough and the liquid collection trough.

In one specific embodiment disclosed in my U.S. Pat. No. 5,049,268, the liquid distribution basin and liquid collection basin each have quadrilateral shape, wherein each basin comprises: the port opening port being disposed at a first said corner and the side edges intersecting at the first corner defining a first included angle w therebetween of from about 60° to about 110°; a second corner diagonally opposite the first corner, and the side edges intersecting at the second corner defining a second included angle x therebetween of from about 45° to about 90°, a third corner transversely adjacent the first corner and longitudinally adjacent the second corner, with the side edges intersecting at the third corner defining a third included angle y therebetween of from about 70° to about 135°; a fourth corner longitudinally adjacent the first corner and transversely adjacent the third corner, with the sides edges intersecting at the fourth corner defining a fourth angle z therebetween of from about 60° to about 90°; and the side edge extending transversely between the second and fourth corners also bounding the associated trough opening extending through the plate and communicating the basin with the flow channel area.

The filter plate disclosed in my U.S. Pat. No. 5,049,268 is very highly efficient in effecting mass transfer operations, e.g. dewatering of aqueous biomass suspensions, desalting of proteins, and removal of secreted metabolites from cellular suspensions. Such filter plate may be readily formed as a unitary article by injection molding thereof from a variety of plastics materials, such as polypropylene, polysulfone, polyvinylchloride, etc., but due to the relatively complex geometric character of the filter plate, the injection molded plates are relatively expensive to produce.

Accordingly, it would be a significant advance in the art to provide a filtration article of a type which provides the superior mass transfer efficiency and utility of the filter plate disclosed in my U.S. Pat. No. 5,049,268, but which is much more economical to produce than the filter plate and sheetholder of U.S. Pat. No. 5,049,268.

It therefore is an object of the present invention to provide such an improved filtration article.

It is another object of the invention to provide a filter comprising a stack of improved filtration articles of such type.

It is another object of the invention to provide a method of making such improved filtration article, in a simple, efficient, and economical manner.

Other objects and advantages of the invention will be more fully apparent from the ensuing disclosure and appended claims.

SUMMARY OF THE INVENTION

This invention relates generally to filtration cassettes, of a type comprising membrane filter sheets arranged in a peripherally bonded array of multilaminate character wherein the filter sheets alternate with foraminous (e.g., screen or mesh) sheet elements, and to cross-flow filters comprising a multiplicity of stacked filtration cassettes of such type, as well as to a method of making such filtration cassettes.

In one aspect, the present invention relates to a filtration cassette comprising a multilaminate array of sheet elements of generally rectangular and generally planar shape with main top and bottom surfaces, wherein the sheet elements include:

a formaminous permeate sheet of screen or mesh material, having (i) a polygonal-shaped basin opening at each opposite end portions of the sheet defining respective inlet and outlet passages, each basin being bounded by generally linear side edges defining corners of the basins at respective intersections of the side edges, and (ii) a filtrate passage opening at a side portion of the sheet;

a first sheet of filter material having (i) a polygonal-shaped basin opening at each of opposite end portions of the sheet defining respective inlet and outlet passages, each basin being bounded by generally linear side edges defining corners of the basin at respective intersections of the side edges, and (ii) a filtrate passage opening at a side portion of sheet, wherein the first sheet of filter material is bonded to the foraminous permeate sheet at their respective end and side portions, with their basin openings and filtrate passage openings in register with one another and the basin openings being circumscribingly bonded at respective end portions of the first sheet of filter material and the formaminous permeate sheet, and with a central portion of the first sheet of filter material and the formaminous permeate sheet being unbonded so as to define a central portion permeate channel of the formaminous permeate sheet communicating with the filtrate passage in the first sheet of filter material and in the formaminous permeate sheet;

a formaminous retentate sheet of screen or mesh material, having (i) a polygonal-shaped basin opening at each of opposite end portions of the sheet defining respective inlet and outlet passages, each basin being bounded by generally linear side edges defining corners of the basin at respective intersections of the side edges, (ii) a filtrate passage opening at a side portion of the sheet, and (iii) a central flow channel of generally rectangular character, extending between and communicating with the basin openings defining the inlet and outlet passages of the formaminous retentate sheet, wherein the foraminous retentate sheet is bonded to the first sheet of filter material at their respective end and side portions, with their basin openings and filtrate passage openings in register with one another and the filtrate passage opening of the foraminous retentate sheet being circumscribingly bonded to the first sheet of filter material, and with a central portion of the first sheet of filter material and the formaminous retentate sheet being unbonded to permit permeate contacting the foraminous retentate sheet to flow through the first sheet of filter material to the foraminous permeate sheet;

a second sheet of filter material having (i) a polygonal-shaped basing opening at each of opposite end portions of the sheet defining respective inlet and outlet passages, each basin being bounded by generally linear side edges defining corners of the basin at respective intersections of the side edges, and (ii) a filtrate passage opening at a side portion of the sheet, wherein the second sheet of filter material is bonded to the foraminous retentate sheet at their respective end and side portions, with their basin openings and filtrate passage openings in register with one another and the filtrate passage opening of the foraminous retentate sheet being circumscribingly bonded to the second sheet of filter material, and with a central portion of the second sheet of filter material and the formaminous retentate sheet being unbonded to permit permeate contacting the foraminous retentate sheet to flow through the second sheet of filter material; and a second formaminous permeate sheet of screen or mesh material, having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a filtrate passage opening at a side portion of the sheet, wherein the second foraminous permeate sheet is bonded to the second sheet of filter material at their respective end and side portions, with their basin openings and filtrate passage openings in register with one another and the basin openings being circumscribingly bonded at respective end portions of the second sheet of filter material and the second formaminous permeate sheet, and with a central portion of the second sheet of filter material and the second formaminous permeate sheet being unbonded so as to define a central portion permeate channel of the second formaminous permeate sheet communicating with the filtrate passage in the second sheet of filter material and in the second formaminous permeate sheet.

The foregoing filtration cassette comprises a "base sequence" of elements, defined as a sequence of sheet elements constituting a foraminous permeate sheet (hereafter designated by the symbol "P"), a filter sheet (hereafter designated by the symbol "F"), a foraminous retentate sheet (hereafter designated by the symbol "R"), a second filter sheet ("F"), and a second foraminous permeate sheet ("P"), thereby providing a sequence of sheet elements, PFRFP.

The base sequence of sheet elements may be utilized in construction of wherein the foraminous permeate sheets P and foraminous retentate sheets R alternate with filter sheets F. An illustrative stacked cassette filter may for example comprise the sheet sequence PFRFPFRFPFRFP, comprising three base sequences PFRFP in the repetitive sequence. In all repetitive sequences, other than a single cassette base sequence, the following relationship is observed: where X is the number of filter sheets F, 0.5 X is the number of foraminous retentate sheets R, and 0.5 X+1 is the number of foraminous permeate sheets P.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation to utilize a single cassette comprising the base sequence PFRFP wherein the outermost foraminous permeate sheets in the sequence are in turn peripherally bonded at their outer faces to a retaining gasket or end plate accommodating removal of permeate from the filtrate passage openings of the constituent sheet element in the cassette.

The sheets of filter material used in the cassette article of the present invention may be of any suitable porosity rating. As used herein, the porosity rating of a sheet of filter material is the smallest particle size which cannot pass through the pores of the filter material. Typical porosity ratings are expressed in molecular weight (MW) and micrometer units, e.g., a 2 micron filter media sheet being a material which will pass particles smaller than 2 microns in diameter through the pores of the material, while particles larger than 2 microns will not be passed through the filter material, a 10,000 MW filter media sheet being a material which will pass particles smaller than 10,000 MW in diameter through the pores of the material, while particles larger than 10,000 MW will not be passed through the filter material.

In one preferred embodiment of the cassette article of the invention, the foraminous retentate sheet is provided with a plurality of transversely spaced-apart, longitudinally extending ribs or partitions, extending upwardly from (the central portion of) each of the main top and bottom faces of the formaminous retentate sheet, such ribs or partitions being of substantially the same height and substantially parallel to one another to define a series of channels between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium.

As used herein, the term "bonded" in reference to adjacent sheets in the multilaminate cassette means that the adjacent sheets are secured to one another in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out with a suitable adhesive or sealant medium, e.g., a urethane, epoxy, or silicone adhesive material, which fills the interstices of the formaminous sheet in the bonded pair of sheets, and adhesively joins one of the adjacent sheets to the other in the bonded areas.

In one specific embodiment of the cassette article of the invention, the basins each have quadrilateral shape, wherein each basin comprises:

side edges intersecting at a first corner of the basin defining a first included angle w therebetween of from about 60° to about 110°;

a second corner diagonally opposite said first corner, and the side edges intersecting at such second corner defining a second included angle x therebetween of from about 45° to about 90°;

a third corner transversely adjacent the first corner and longitudinally adjacent the second corner, with the side edges intersecting at the third corner defining a third included angle y therebetween of from about 70° to about 135°;

a fourth corner longitudinally adjacent the first corner and transversely adjacent the third corner, with the sides edges intersecting at the fourth corner defining a fourth angle z therebetween of from about 60° to about 90°.

In another specific embodiment of the cassette article of the invention, the distribution basins each have triangular shape and comprise:

side edges intersecting at a first corner defining a first included angle a therebetween of from about 60° to about 120°;

side edges intersecting at a second corner defining an included angle b therebetween of from about 15° to about 45°;

a third corner transversely opposite the second corner, with the side edges intersecting at the third corner defining an included angle c therebetween of from about 45° to about 75°.

Each sheet element in the cassette broadly described hereinabove may suitably comprise filtrate passage openings at each side portion of the sheet.

In a specific aspect of the invention, each of the foraminous permeate and retentate sheets may constitute a foraminous material of from about 80 to about 300 mesh, in mesh size and characteristic. Each of the foraminous permeate and retentate sheets may comprise a woven polymeric mesh, e.g., of a material selected from the group consisting of polyester, polypropylene, nylon, fluorocarbon polymers such as polytetrafluoroethylene, polyethylene, and polysulfone.

The permeate and retentate sheets alternatively may comprise a non-woven material, if of suitable foraminous character, or alternatively may comprise a sintered metal matrix, or other structural element of the desired porosity and permeability characteristics.

The filter sheets used in the filtration cassette of the present invention may be of any suitable materials, such as a material selected from the group consisting of cellulose, polyphenylene oxide, polysulfone, cellulose nitrate, cellulose acetate, polyether amide, polyphenylene oxide/polysulfone blends, mixed esters of cellulose, and polyether sulfone.

Another aspect of the present invention relates to a stacked cassette cross-flow filter comprising articles articles of the type described above.

Another aspect of the present invention relates to a pair of end plates or manifold assembly in which the cassettes are secured for operation.

Other aspects and features of the present invention will be more fully apparent from the ensuing disclosure and appended claims.

DETAILED DESCRIPTION OF THE INVENTION, AND PREFERRED EMBODIMENTS THEREOF

The filter cassette of the present invention is suitably adapted to be employed in stacked arrays to form a stacked cassette filter assembly in which the base sequence of formaminous permeate sheet (P), filter sheet (F), formaminous retentate sheet (R), filter sheet (F), formaminous permeate sheet (P) may be repeated in the filter assembly as desired, e.g., in a repetitive sequence of formaminous permeate sheet (P), filter sheet (F), formaminous retentate sheet (R), filter sheet (F), formaminous permeate sheet (P), filter sheet (F), formaminous retentate sheet (R), filter sheet (F), formaminous permeate sheet (P), filter sheet (F), formaminous retentate sheet (R), filter sheet (F), and formaminous permeate sheet (P). Thus, the filter cassette of desired total mass transfer area is formed from a stack of the repetitive sequences. In all repetitive sequences, except for a single unit sequence, the following relationship is observed: where X is the number of filter sheets, 0.5 X is the number of retentate sheets, and 0.5 X +1 is the number of permeate sheets.

The filter sheets, and the foraminous retentate and permeate sheets employed therewith, may be formed of any suitable materials of construction, including, for example, polymers, such as polypropylene, polyethylene, polysulfone, polyimide, polyvinylchloride, polyester, etc.; nylon, regenerated cellulose, polycarbonate, cellulose acetate, cellulose triacetate, cellulose nitrate, mixed esters of cellulose, etc.; ceramics, e.g., oxides of silicon, zirconium, and/or aluminum; metals such as stainless steel; polymeric fluorocarbons such as polytetrafluoroethylene; and compatible alloys, mixtures and composites of such materials.

Preferably, the filter sheets and the foraminous retentate and permeate sheets are made of materials which are adapted to accommodate high temperatures and chemical sterilants, so that the interior surfaces of the filter may be steam sterilized and/or chemically sanitized for regeneration and reuse, as "steam-in-place" and "sterilized in situ" structures. Steam sterilization typically may be carried out at temperatures on the order of from about 121° C. to about 130° C., at steam pressures of 15–30 psi, and at a sterilization exposure time typically on the order of from about 15 minutes to about 2 hours, or even longer. Alternatively, the entire cassette structure may be formed of materials which render the cassette article disposable in character.

The end plates used with the cassette articles of the invention to form a unitary filter assembly may be formed of any suitable materials of construction, including, for example, stainless steel, or polymers such as polypropylene, polysulfone, and polyetherimide.

Figure 1:
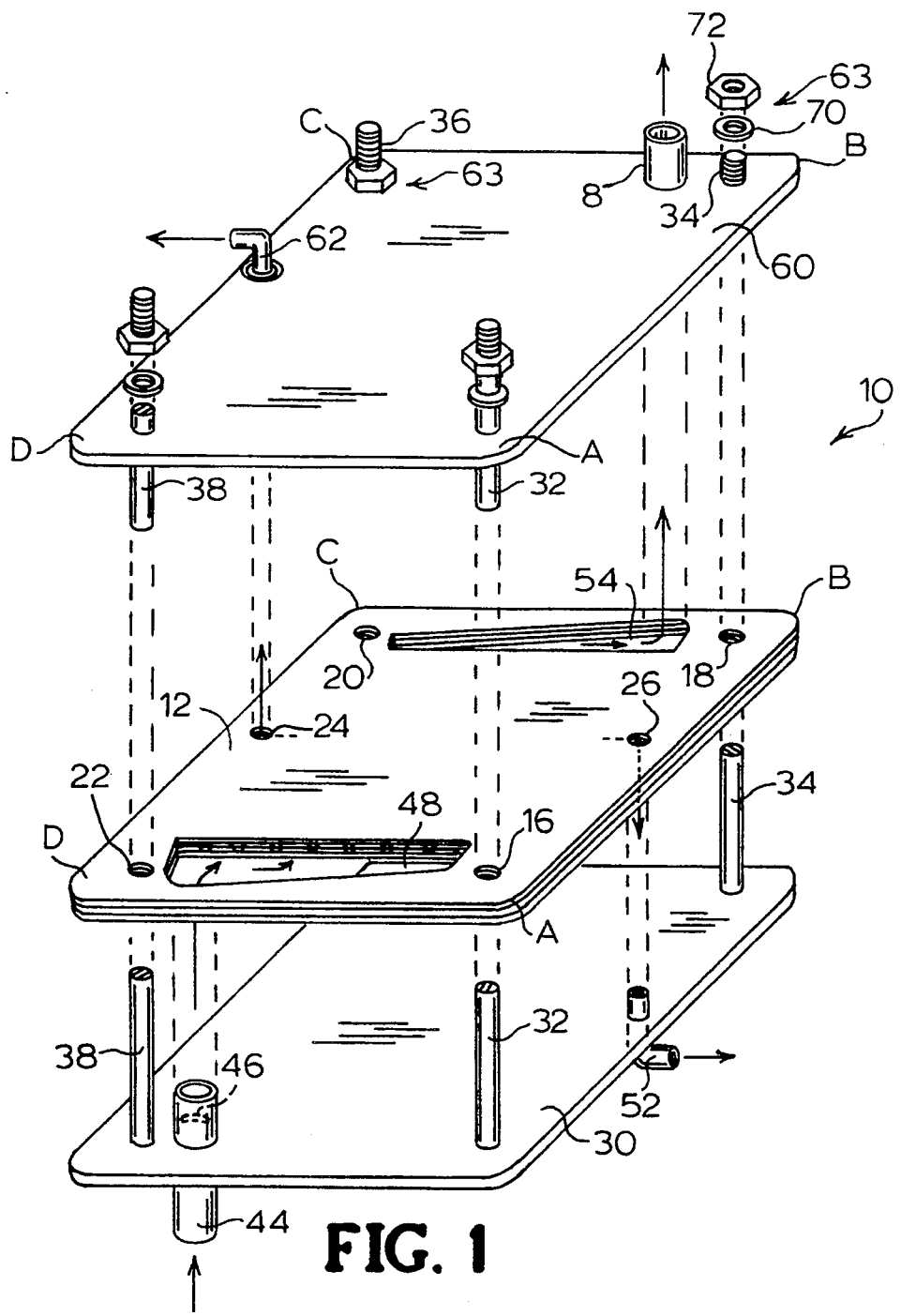
FIG. 1 is a perspective view of a filter assembly comprising a filtration cassette according to one embodiment of the present invention and the end plates.

FIG. 1 is a perspective view of a cross-flow filter 10 comprising a cassette article 12 according to one embodiment of the present invention. The cassette is of a multilaminate construction, comprising a plurality of sheets as described hereinafter in greater detail, peripherally bonded to one another at their end and side margins.

For ease of description in the ensuing discussion, the respective corners of the cassette as shown in FIG. 1 are lettered consecutively, beginning at the lower right-hand corner A as shown and, proceeding counterclockwise, including upper right-hand corner B, upper left-hand corner C, and lower left-hand corner D.

In the vicinity of these consecutive corners A, B, C, and D, of the cassette are provided openings, 16, 28, 20, and 22, respectively, which extend through the cassette and are employed for mounting of the cassette on rods of diameter closely approximate but slightly smaller than the respective openings. In this respect, it is to be noted that opening 20 is of large size (diameter) than the remaining openings 16, 18, and 22. The purpose of such disparity in opening size is to provide a "keying" feature whereby the proper alignment of the plate is secured, since only opening 20 will fit over a large-sized rod of corresponding diameter, whereas opening 16, 18, and 22 will not accommodate passage over such a large-sized rod.

Other features or structures may be employed for the same purpose, viz., of keying the cassette to a predetermined proper orientation, in place of the different sized opening 20 relative to the remaining same-sized corner openings 16, 18, and 22, for example one of the respective corner openings may be of a different shape than the others, e.g., square or triangular in cross-section, rather than circular.

The filtration cassette 12 also is provided at its respective side margins, at the mid-section of the longitudinally extending cassette, with openings 24 and 26 extending through the cassette. These openings may be employed for egress of permeate produced in the filtration operation when the cassette is deployed in the stacked cassette filter assembly illustrated, and/or otherwise for accommodating ingress/egress of a selected fluid, such as steam or other sterilant fluid for effecting cleaning and regeneration of the filter, or a secondary fluid for mass transfer contacting with a primary fluid passage through the filter.

This filter 10 comprises a base including a mounting plate 30 having vertically upwardly extending rods 32, 34, 36, and 38 at its respective corner portions as shown. Each of the rods, 32, 34, and 38 are of the same diameter, while the fourth rod 36 is of larger diameter, to provide the plate orientation keying structure, which will ensure that the constituent plates of the filter assembly are assembled in the proper orientation, since the corresponding rod mounting openings 16, 18, and 22 in the cassettes, e.g., cassette 12, are of the same diameter, accommodating the smaller diameter rods, while the fourth ro mounting opening 20 is of larger diameter, to accommodate rod 36. Thus, by providing a rod of larger diameter, and forming the cassettes 12 with correspondingly shaped openings, the proper registration of the cassette openings with the proper rods is assured, resulting in correct orientation of the respective stacked filtration cassettes in the array.

It will be appreciated from the foregoing that any other cassette orientation registration device may be employed to ensure to correct positioning of the successive stacked filtration cassettes on the mounting plate 30. For example, the cassettes are oriented with their successive notches superposed with respect to one another. Alternatively, the cassette itself may be embossed, etched, or otherwise manufactured with an orientational device, e.g., a raised protrusion in the shape of an arrow, to indicate the correct orientation of the filtration cassettes when stacked on the mounting plate 30. Although only one filtration cassette is illustratively shown in the FIG. 1 embodiment, it will be recognized that one or a plurality of cassettes may be employed to form a filter in accordance with the present invention.

Between the cassette 12 and mounting plate 30, there may optionally be provided a sealing gasket (not shown) which is equipped with openings to accommodate its positioning over the respective rods 32, 34, 36, and 38, so that the gasket seals the bottom surface of the cassette 12.

Overlying the cassette 12 in the exploded array of FIG. 1 is an upper end plate 60, which at each of its respective corner portions is provided with a suitable opening accommodating the insertion therethrough of the rods 32, 34, 36, and 38, which as shown are suitably engaged by mechanical fastener assemblies 63, comprising washer 70 and lock-nut 72, which threadably engages the complementarily threaded upper ends of the respective rods 32, 34, 36, and 38.

At the upper right-hand corner portion B of the end plate 60 shown in FIG. 1, adjacent to rod 34, there is provided a liquid outlet conduit 8 extending through the end plate 60 and communicating with the quadrilateral-shaped collection basin 59 of the cassette.

The end plate 60 also is provided at its left-hand side margins, at the mid-section of the longitudinally extending plate, with permeate outlet conduit 62. This is employed for egress of permeate produced in the filtration operation (and issuing from filtrate or permeate opening 24 in cassette 12) and/or otherwise for accommodating ingress/egress of a selected fluid, such as steam or other sterilant fluid for effecting cleaning and regeneration of the filter.

At the lower left-hand portion of the mounting plate 30 as shown in FIG. 1 there is provided a liquid inlet conduit 44 extending through the plate and having a liquid feed opening 46 therein, in register with distribution basin 48 of the cassette.

The mounting plate 30 also is provided at its right-hand side margin, at the mid-section of the longitudinally extending plate, with permeate outlet conduit 52. This conduit is employed for egress of permeate produced in the filtration operation (and issuing from filtrate or permeate opening 24 in cassette 12), and/or otherwise for accommodating ingress/egress of a selected fluid, such as steam or other sterilant fluid for effecting cleaning and regeneration of the filter.

The cassette 12 shown in FIG. 1 has a quadrilateral-shaped feed distribution trough, in which liquid entering in feed liquid conduit 44 issues from feed liquid opening 46 therein and is distributed in the feed distribution basin 46, from which passes longitudinally through the cassette 12, in a flow channel provided between the foraminous retentate sheet and adjacent filter sheets, as hereinafter more fully described. In the flow channel, the permeate components of the feed material passes through the filter sheets adjacent to the retentate sheet, and flows into next-adjacent permeate channels, from which the permeate flows to openings 24 and 26. The retentate then issues from an opposite end portion of the central flow channel of the cassette into the collection basin 54, from which the retentate is discharged from the filter in liquid conduit 8.

It will be appreciated that the permeate openings 24 and 26 may, as previously described, be coupled to a flow circuit including a second mass transfer medium which is to be passed in mass transfer relationship to the primary feed material stream entering the filter in conduit 44. By such arrangement, mass transfer is able to be carried out in both directions across the filter sheets in the cassette. Alternatively, the filter may be used as shown, with the openings 24 and 26 being used for discharge of permeate. It will be recognized that instead of one permeate conduit 52 on the support plate 30, and one permeate conduit 62 on the upper end plate 60, both permeate outlet conduits may be provided on mounting plate 30, or on upper end plate 60, or alternatively, both plates may feature two permeate discharge conduits secured thereto and in communication with the permeate openings of the cassette(s).

Figure 2:
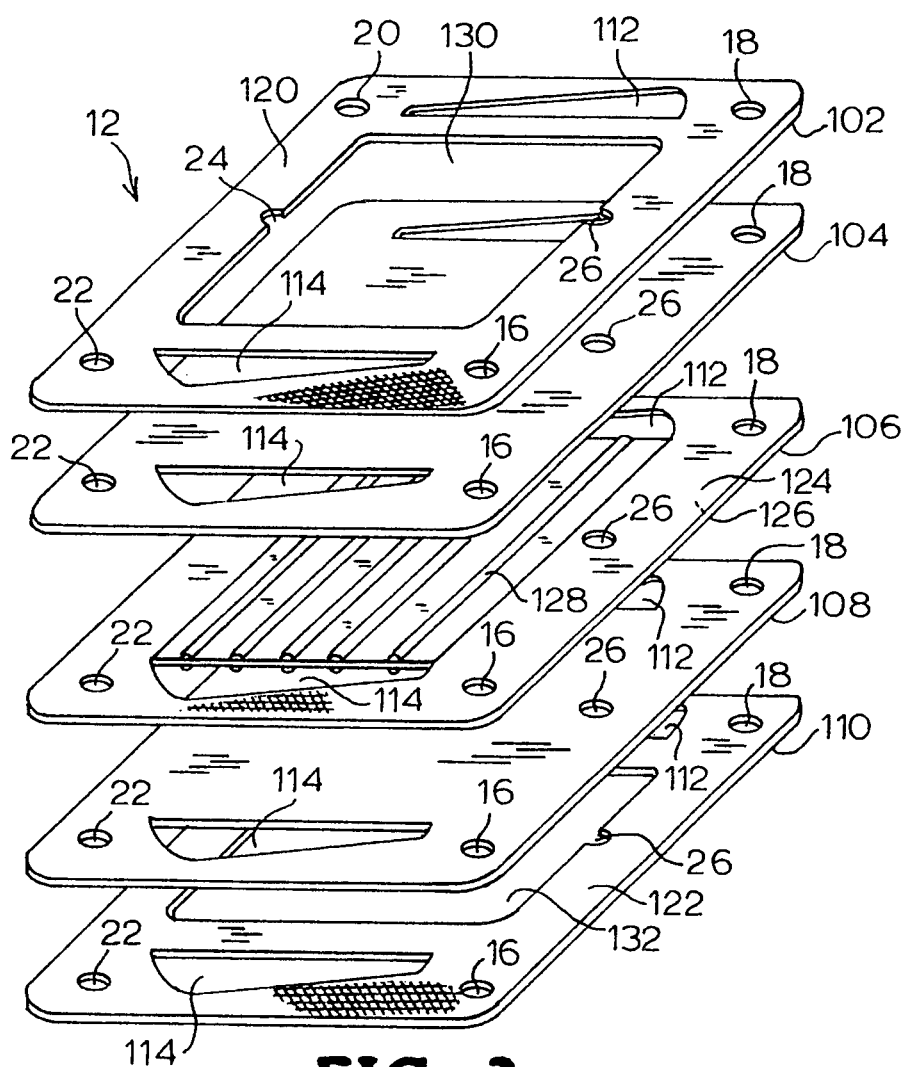
FIG. 2 is an exploded perspective view of a filtration cassette according to one embodiment of the present invention.

FIG. 2 is an exploded perspective view of a cassette 12 employed in the FIG. 1 filter, and comprising a foraminous permeate sheet 102, a filter sheet 104, a foraminous retentate sheet 106, a filter sheet 108, and a foraminous permeate sheet 110, as constituent sheets in the multilayer array.

As shown, each of the constituent sheets has a generally quadrilateral-shaped cut-out opening 112 at one end thereof, and a similar cut out opening 114 at the opposite end thereof, and each of the sheets is provided with corner openings 16, 18, 20 and 22.

Each of sheets is generally co-extensive in areal extent with the others, and when consolidated into a unitary cassette article, the cutout openings 112 and 114 in each of the respective sheet elements is in registration, as are the rod openings 16, 18, 20, and 22. The sheets are each bonded at their side and end extremities to the next adjacent sheet in the cassette, and the permeate sheet 102 is bonded at its peripheral region 120 to the corresponding peripheral region of filter sheet 104, and in like manner the permeate sheet 110 is bonded at its peripheral portion 122 to filter sheet 108. Retentate sheet 106 is bonded at its outer periphery 124 on its top face to filter sheet 104, and the retentate sheet at its bottom face is bonded along its peripheral region 126 to filter sheet 108.

On the retentate sheet, a series of longitudinally extending, transversely spaced-apart ribs 128 are provided extending from the inlet basin opening 114 to the collection basin opening 112, and a corresponding array of ribs may be provided on the bottom face of the retentate sheet, as shown.

Permeate sheets 102 and 110 and retentate sheet 106 are foraminous elements, suitably formed of screen or mesh material as previously described. The ribs 28 may suitably be formed by beads of adhesive medium, e.g., an RTV silicone adhesive, prior to the assembly of the cassette article.

The permeate sheets 122 and 102 are suitably bonded to the adjacent filter sheets (108 and 104, respectively) in such manner as to leave an unbonded central area 130 on permeate sheet 102 and 132 on permeate sheet 110 which communicates with the filtrate or permeate openings 24 and 26, whereby filtrate is readily removed from the cassette in use.

Figure 3:
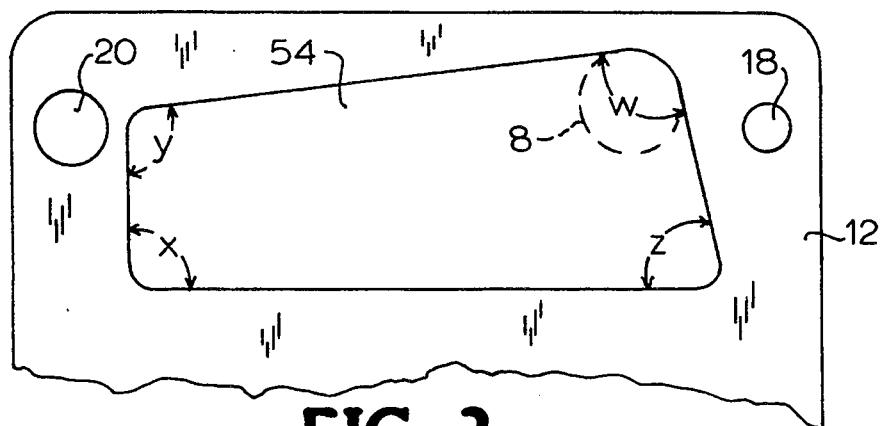
FIG. 3 is a plan view of a portion of a cassette, featuring a quadrilateral-shaped basin.

FIG. 3 is a top plan view of a portion of a cassette article 12, wherein the collection basin is of quadrilateral shape, featuring constituent corner angles w, x, y, and z, as hereinafter more fully described.

Figure 4:
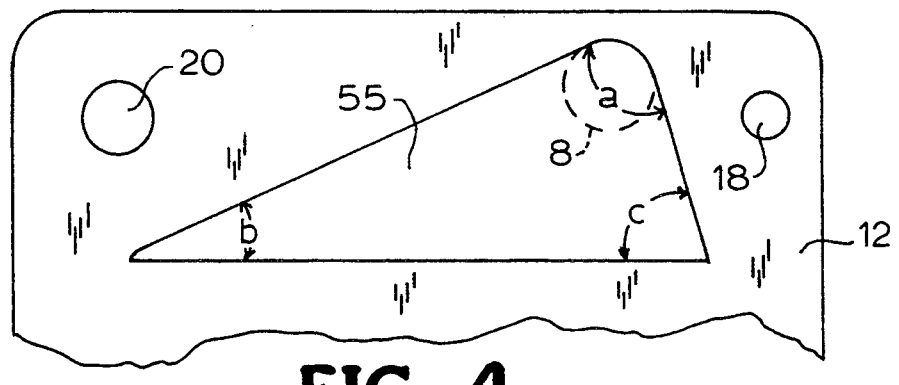
FIG. 4 is a top plan view of a portion of a filtration cassette according to another embodiment of the invention, featuring a triangular-shaped basin.

FIG. 4 is a top plan view of a cassette 12 according to another embodiment of the invention featuring a triangular-shaped basin 55, whose component basin angles are denoted as a, b, and c. Shown in dashed line representation in the basin is the liquid collection conduit 8, denoting the position of the liquid withdrawal conduit relative to the basin structure. It will be recognized that the inlet distribution basins corresponding to the outlet collection basin shown in FIGS. 3 and 4, respectively, are similarly configured, with respect to their shape and component angles, relative to the same cassette article, although the distribution and collection basins could in some applications advantageously be of different shape and/or.

In the illustrative filter cassette embodiment of the invention, as shown in FIGS. 1, 2 and 3, the quadrilateral-shaped basins 48 and 49 may include an obtuse angle w of about 94°, a substantially right (90°) angle x, an obtuse angle y of about 96°, and an acute angle z of about 80°, at the respective corners of the basin.

Although the quadrilateral shape of the respective liquid distribution 48 and collection 54 basins may be widely varied in the broad practice of the present invention, as regards the specific values of the corner angles of such basins, the specific shape and angles show in FIGS. 1 and 3 are most preferred to facilitate uniformity of flow path length for liquid across the entire areal extent of the respective basins and flow channel area, i.e., a generally uniform velocity profile of the fluid flowing longitudinally across the flow channel area of the cassette.

In general, the respective corner angles of the quadrilateral-shaped basins in the cassette of the invention may be varied considerably, in accordance with the general ranges and values specified in Table I below.

TABLE I

| Corner Angle Ranges and Values for Quadrilateral-Shaped Liquid Distribution and Collection Basins | | |
|---|---|---|
| Basin Corner Angle | General Range and Values | Preferred Range and Value |
| w, w' | about 60° to about 110° | about 90° to about 100° |
| x, x' | about 45° to about 90° | about 80° to about 90° |
| y, y' | about 70° to about 140° | about 80° to about 115° |
| z, z' | about 60° to about 90° | about 75° to about 90° |

In the filtration casette shown in FIG. 3, wherein the distribution basins each have triangular shape, each basin suitably comprises: side edges intersecting at a first corner defining a first included angle a therebetween of from about 60° to about 120°; side edges intersecting at a second corner defining an included angle b therebetween of from about 15° to about 45°; and a third corner transversely opposite the second corner, with the side edges intersecting at the third corner defining an included angle c therebetween of from about 45° to about 75°.

The filter cassette of the present invention may be fabricated in any suitable manner, including casting, injection molding, dielectric bonding, solvents adhesive bonding, etc., the specific method of fabrication depending on the material of construction and the desired end use. For example, polysulfone is a preferred material of construction for the filter sheets, alternating with polyester formaminous retentate and permeate sheets, and bonded by urethane adhesive. Accordingly, when polysulfone, polyester, and urethane are utilized as the materials of construction, dielectric bonding may suitably be employed as the method of fabrication.

Figure 5:
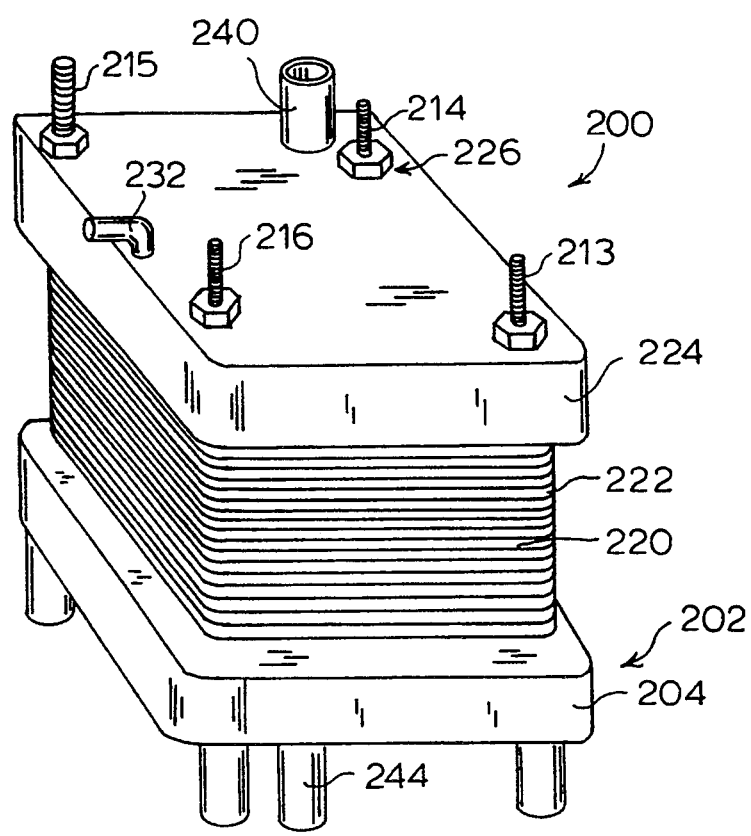
FIG. 5 is a perspective elevation view of a filter comprising multiplicity of cassette articles according to the present invention.

FIG. 5 shows a perspective elevation view of a filter according to one embodiment of the invention, utilizing a plurality of cassettes according to the invention, to form a stacked cassette array.

This stacked cassette filter 200 comprises a base 202 including a mounting plate 204 having vertically upwardly extending rods 213, 214, 215, and 216 at its respective corner portions as shown. Each of the rods 213, 214, and 216 are of the same diameter, while the fourth rod 215 is of larger diameter, to provide a cassette orientation keying structure, which will ensure that the constituent cassettes of the filter assembly are assembled in the proper orientation, with the corresponding rod mounting openings in the cassette being appropriately sized for such rods.

The stacked cassettes 220 form a stack cassette array 222 which is retained between the plate 204 and upper end plate 224, as shown, with mechanical fastener means 226 being provided on the respective threaded rods to provide the necessary compressive action on the cassette array 222. The upper end plate features a permeate outlet conduit 232, and a corresponding permeate egress conduit is provided on the opposite side at the bottom of plate 204 (not shown in FIG. 5). At the upper right-hand corner portion of upper end plate 224 is provided a retentate discharge conduit 240, and at the lower left-hand of the filter is provided a feed material inlet conduit 244, as shown.

Inlet conduit 244 may be joined to a suitable source of material to be separated, which then can be provided under suitable temperature, pressure, and flow rate conditions to the filter 200 for separation therein into retentate, discharged in conduit 240, and permeate, discharged in conduit 232 (as well as the corresponding filtrate or permeate conduit at the opposite lower portion of the filter (not shown).

It will be apparent from the foregoing that the respective sections of stacked cassettes may be variously joined in fluid flow communication with one another, in parallel or in series, to form stacked filter "trains" whose constituent sections may be employed to carry out a number of unit operations on an influent or feed material, such as concentrating (dewatering), washing, dialyzing, desalting, etc.

For example, a stacked filter train of series-connected sections may be employed in a culturing system of the type disclosed and claimed in my U.S. Pat. No. 4,885,087, and copending U.S. Ser. No. 07/207,655 filed Jun. 21, 1988, the disclosures of which hereby are incorporated by reference, in applications such as the production in vitro of human immunodeficiency virus (HIV) on cellular or synthetic substrates. In such HIV production application, a first stacked cassette section could be employed to concentrate HIV, a second section could be utilized to add media to or withdraw media from the system, all without withdrawing any virus, such as may otherwise present a risk of immunosuppressive infection. Thus, a closed system virus culturing arrangement is provided, which is highly advantageous not only for the production of HIV but also the culturing or other processing of pathogenic as well as non-pathogenic bacterial, viral, and yeast species.

While the invention has been described with reference to specific illustrative embodiments, it will be apparent that there are other variations, modifications, and embodiments possible within the broad scope of the invention, and that all such variations, modifications, and embodiments are to be regarded as being within the spirit and scope of the invention.

What is claimed is:

1. A filtration cassette comprising a multilaminate array of sheet elements of generally rectangular and generally planar shape with main top and bottom surfaces, wherein the sheet elements include."

a first foraminous permeate sheet of screen or mesh material, having (i) a polygonal-shaped distribution basin open at each of opposite end portions of the sheet defining respective inlet and outlet passages, each distribution basin being bounded by generally linear side edges defining corners of the basin at respective intersections of the side edges, and (ii) a permeate passage opening at side portion of the sheet;

a first sheet of filter material having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet, wherein the foraminous permeate sheet is bonded to the first sheet of filter material at their respective end and side portions, with their basin openings and permeate passage openings in register with one another and the basin openings being circumscribingly bonded at respective end portions of the first sheet of filter material and the first foraminous permeate sheet, and with a central portion of the first sheet of filter material and the foraminous permeate sheet being unbonded so as to define a central portion of the permeate channel of the foraminous permeate sheet communicating with the permeate passage in the first sheet of filter material and the foraminous permeate sheet;

a foraminous retentate sheet of screen or mesh material, having (i) a polygonal-shaped distribution basin opening at each of opposite end portions of the sheet defining respective inlet and outlet passages, each distribution basin being bounded by generally linear side edges defining corners of the basin at respective intersections of the side edges, (ii) a permeate passage opening at a side portion of the sheet, and (iii) a central flow channel of generally rectangular character, extending between and communicating with the distribution basin openings defining the inlet and outlet passages of the foraminous retentate sheet, wherein the foraminous retentate sheet is bonded to the first sheet of filter material at their respective end and side portions, on an opposite side of the first sheet of filter material than the first foraminous permeate sheet, with their basin openings and permeate passage openings in register with one another and the permeate passage opening of the foraminous retentate sheet being circumscribingly bonded to the first sheet of filter material, and with a central portion of the first sheet of filter material and the foraminous retentate sheet being unbonded to permit permeate contacting the foraminous retentate sheet to flow through the first sheet of filter material to the foraminous permeate sheet;

a second sheet of filter material having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet, wherein the foraminous retentate sheet is bonded to the second sheet of filter material at their respective end and side portions, on an opposite side of the foraminous retentate sheet than the first sheet of filter material, with their basin openings and permeate passage openings in register with one another and the permeate passage opening of the foraminous retentate sheet being circumscribingly bonded to the second sheet of filter material, and with a central portion of the second sheet of filter material and the foraminous retentate sheet being unbonded to permit permeate contacting the foraminous retentate sheet to flow through the second sheet of filter material; and a second foraminous permeate sheet of screen or mesh material, having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet wherein the second foraminous permeate sheet is bonded to the second sheet of filter material at their respective end and side portions, on an opposite side of the second sheet of filter material than the foraminous retentate sheet, with their basin openings and permeate passage openings in register with one another and the basin openings being circumscribingly bonded at respective end portions of the second sheet of filter material and the second foraminous permeate sheet, and with a central portion of the second sheet of filter material and the second foraminous permeate sheet being unbonded so as to define a central portion permeate channel of the second foraminous permeate sheet communicating with the permeate passage in the second sheet of filter material and the second foraminous permeate sheet;

wherein the foraminous retentate sheet of screen or mesh material on each face thereof comprises a series of transversely spaced-apart, longitudinally extending ribs, each extending outwardly from the foraminous retentate sheet to an outer extremity, with the first and second sheets of filter material additionally bonded to the foraminous retentate sheet at rib extremities on respective sides thereof.

2. A filtration cassette according to claim 1, wherein the distribution basins each have quadrilateral shape, and wherein each basin comprises:

side edges intersecting at a first corner of the basin defining a first included angle w therebetween of from about 60° to about 110°;

a second corner diagonally opposite said first corner, and the side edges intersecting at such second corner defining a second included angle x therebetween of from about 45° to about 90°;

a third corner transversely adjacent the first corner and longitudinally adjacent the second corner, with the side edges intersecting at the third corner defining a third included angle y therebetween of from about 70° to about 135°;

a fourth corner longitudinally adjacent the first corner and transversely adjacent the third corner, with the sides edges intersecting at the fourth corner defining a fourth angle z therebetween of from about 60° to about 90°.

3. A filtration cassette according to claim 1, wherein the distribution basins each have quadrilateral shape, and wherein each basin comprises:

side edges intersecting at a first corner defining a first included angle a therebetween of from about 60° to about 120°;

side edges intersecting at a second corner defining an included angle b therebetween of from about 15° to about 45°;

a third corner transversely opposite the second corner, with the side edges intersecting at the third corner defining an included angle c therebetween of from about 45° to about 75°.

4. A filtration cassette according to claim 1, wherein each sheet of the cassette comprises a permeate passage opening at each side portion of the sheet.

5. A filtration cassette according to claim 1, wherein each of the foraminous permeate and retentate sheets have a mesh size characteristic of from about 80 to about 300.

6. A filtration cassette according to claim 1, wherein each of the foraminous permeate and retentate sheets comprises a woven polymeric mesh.

7. A filtration cassette according to claim 6, wherein the woven polymeric mesh comprises a material selected from the group consisting of polyester, polypropylene, nylon, fluorocarbon polymers, polyethylene, and polysulfone.

8. A filtration cassette according to claim 1, wherein sheets of filter material comprise a material selected from the group consisting of cellulose, polyphenylene oxide, polysulfone, cellulose nitrate, cellulose acetate, polyether amide, polyphenylene oxide/polysulfone blends, mixed esters of cellulose, and polyethersulfone.

9. A filtration cassette according to claim 1, wherein the ribs are formed of an adhesive bonding material.

10. A filtration cassette according to claim 9, wherein the adhesive bonding material is selected from the group consisting of urethane, epoxy and silicone adhesives.

11. A filtration cassette according to claim 1, wherein the sheets in the cassette are bonded to one another with an adhesive bonding medium selected from the group consisting of urethane, epoxy and silicone adhesives.

12. A stacked cassette filter including a stacked array of filtration cassettes each comprising a multilaminate array of sheet elements of generally rectangular and generally planar shape with main top and bottom surfaces, wherein the sheet elements include:

a first foraminous permeate sheet of screen or mesh material, having (i) a polygonal-shaped distribution basin open at each of opposite end portions of the sheet defining respective inlet and outlet passages, each distribution basin being bounded by generally linear side edges defining corners of the basin at respective intersections of the side edges, and (ii) a permeate passage opening at side portion of the sheet;

a first sheet of filter material having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet, wherein the foraminous permeate sheet is bonded to the first sheet of filter material at their respective end and side portions, with their basin openings and permeate passage openings in register with one another and the basin openings being circumscribingly bonded at respective end portions of the first sheet of filter material and the first foraminous permeate sheet, and with a central portion of the first sheet of filter material and the foraminous permeate sheet being unbonded so as to define a central portion of the permeate channel of the foraminous permeate sheet communicating with the permeate passage in the first sheet of filter material and the foraminous permeate sheet;

a foraminous retentate sheet of screen or mesh material, having (i) a polygonal-shaped distribution basin opening at each of opposite end portions of the sheet defining respective inlet and outlet passages, each distribution basin being bounded by generally linear side edges defining corners of the basin at respective intersections of the side edges, (ii) a permeate passage opening at a side portion of the sheet, and (iii) a central flow channel of generally rectangular character, extending between and communicating with the distribution basin openings defining the inlet and outlet passages of the foraminous retentate sheet, wherein the foraminous retentate sheet is bonded to the first sheet of filter material at their respective end and side portions, on an opposite side of the first sheet of filter material than the first foraminous permeate sheet, with their basin openings and permeate passage openings in register with one another and the permeate passage opening of the foraminous retentate sheet being circumscribingly bonded to the first sheet of filter material, and with a central portion of the first sheet of filter material and the foraminous retentate sheet being unbonded to permit permeate contacting the foraminous retentate sheet to flow through the first sheet of filter material to the foraminous permeate sheet;

a second sheet of filter material having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet, wherein the formaminous retentate sheet is bonded to the second sheet of filter material at their respective end and side portions, on an opposite side of the foraminous retentate sheet than the first sheet of filter material, with their basin openings and permeate passage openings in register with one another and the permeate passage opening of the foraminous retentate sheet being circumscribingly bonded to the second sheet of filter material, and with a central portion of the second sheet of filter material and the foraminous retentate sheet being unbonded to permit permeate contacting the foraminous retentate sheet to flow through the second sheet of filter material; and a second foraminous permeate sheet of screen or mesh material having (i) a polygonal-shaped distribution basin opening at each of opposite end portions of the sheet defining respective inlet and outlet passages, each distribution basin being bounded by generally linear side edges defining corners of the basin at respective intersections of the side edges, and (ii) a permeate passage opening at a side portion of the sheet, wherein the second foraminous permeate sheet is bonded to the second sheet of filter material at their respective end and side portions, on an opposite side of the second sheet of filter material than the foraminous retentate sheet, with their basin openings and permeate passage openings in register with one another and the basin openings being circumscribingly bonded at respective end portions of the second sheet of filter material and the second foraminous permeate sheet, and with a central portion of the second sheet of filter material and the second foraminous permeate sheet being unbonded so as to define a central portion permeate channel of the second foraminous permeate sheet communicating with the permeate passage in the second sheet of filter material and the second foraminous permeate sheet;

wherein the foraminous retentate sheet of screen or mesh material on each face thereof comprises a series of transversely spaced-apart, longitudinally extending ribs, each extending outwardly from the foraminous retentate sheet to an outer extremity, with the first and second sheets of filter material additionally bonded to the foraminous retentate sheet at rib extremities on respective sides thereof.

13. A stacked cassette filter according to claim 12, wherein the stacked array contains a number X of filter sheets, 0.5X formaminous retentate sheets, and 0.5X+1 formaminous permeate sheets.

* * * * *